US006792332B1

(12) United States Patent
DePoi

(10) Patent No.: US 6,792,332 B1
(45) Date of Patent: Sep. 14, 2004

(54) METHOD FOR DYNAMIC ACCELERATION IN AN ARTICLE TRANSPORTING SYSTEM

(75) Inventor: Arthur H DePoi, Brookfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 10/608,964

(22) Filed: Jun. 27, 2003

(51) Int. Cl.[7] .................................................. G06F 7/00
(52) U.S. Cl. .................... 700/213; 271/270; 198/459.1; 198/460.1
(58) Field of Search ................................ 700/213, 228, 700/302, 304; 271/270; 198/459.1, 459, 460.1, 461

(56) References Cited

U.S. PATENT DOCUMENTS 4,451,027 A * 5/1984 Alper ...................... 271/10.02
6,023,034 A * 2/2000 Nakajima et al. ........... 209/584
6,644,660 B2 * 11/2003 Sussmeier et al. .......... 271/270
6,685,184 B2 * 2/2004 Tufekci et al. .............. 271/270
6,687,570 B1 * 2/2004 Sussmeier et al. .......... 700/220

* cited by examiner

*Primary Examiner*—Khoi H. Tran
(74) *Attorney, Agent, or Firm*—Michael J. Cummings; Charles R. Malandra, Jr.; Angelo N. Chaclas

(57) ABSTRACT

A method for controlling the serial transport of articles to achieve a predetermined gap between transported articles. First and second articles are transported serially on a transport system. The velocities and positions of the first and second articles are measured during the transporting process. An adjustment for the position of the second article is determined in a periodic operating cycle using the following steps: calculating a current gap between the first and second articles, determining a distance from the second document to the edge of the predetermined gap, and calculating a minimum displacement needed to decelerate the second article to the velocity of the first article. Based on these calculations, if the distance from the second document to the edge of the gap is substantially the same as the minimum deceleration distance, then the second article is accelerated at a calculated acceleration so that to ensure that the minimum deceleration distance does not encroach into the predetermined gap, and that the second document continues to approach the predetermined gap.

9 Claims, 3 Drawing Sheets

METHOD FOR DYNAMIC ACCELERATION IN AN ARTICLE TRANSPORTING SYSTEM

TECHNICAL FIELD

The present invention relates to a transport module such as one for use in a high speed mass mail processing and inserting system. The transport provides a staging area for transferring asynchronously produced accumulations of documents generated by the inserter input subsystem to the synchronous transport of the inserter chassis. The transport further provides "parking spots" for accumulations of documents that are already in progress of being created when downstream modules stop.

BACKGROUND OF THE INVENTION

Inserter systems, such as those applicable for use with the present invention, are typically used by organizations such as banks, insurance companies and utility companies for producing a large volume of specific mailings where the contents of each mail item are directed to a particular addressee. Also, other organizations, such as direct mailers, use inserts for producing a large volume of generic mailings where the contents of each mail item are substantially identical for each addressee. Examples of such inserter systems are the 8 series, 9 series, and APS™ inserter systems available from Pitney Bowes Inc. of Stamford, Conn.

In many respects, the typical inserter system resembles a manufacturing assembly line. Sheets and other raw materials (other sheets, enclosures, and envelopes) enter the inserter system as inputs. Then, a plurality of different modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

The input stages of a typical inserter system are depicted in FIG. 1. At the input end of the inserter system, rolls or stacks of continuous printed documents, called a "web," are fed into the inserter system by a web feeder 10. The continuous web must be separated into individual document pages. This separation is typically carried out by a web cutter 20 that cuts the continuous web into individual document pages. Downstream of the web cutter 20, a right angle turn 30 may be used to reorient the documents, and/or to meet the inserter user's floor space requirements.

The separated documents must subsequently be grouped into collations corresponding to the multi-page documents to be included in individual mail pieces. This gathering of related document pages occurs in the accumulator module 40 where individual pages are stacked on top of one another.

The control system for the inserter senses markings on the individual pages to determine what pages are to be collated together in the accumulator module 40. In a typical inserter application, mail pieces may include varying number of pages to be accumulated. For example, the phone bill for a person who lives by himself may be much shorter than the another phone bill representing calls made by a large family. It is this variation in the number of pages to be accumulated that makes the output of the accumulator 40 asynchronous, that is, not necessarily occurring at regular time intervals.

Downstream of the accumulator 40, a folder 50 typically folds the accumulation of documents, so that they will fit in the desired envelopes. To allow the same inserter system to be used with different sized mailings, the folder 50 can typically be adjusted to make different sized folds on different sized paper. As a result, an inserter system must be capable of handling different lengths of accumulated and folded documents.

Downstream of the folder 50, a buffer transport 60 transports and stores accumulated and folded documents in series in preparation for transferring the documents to the synchronous inserter chassis 70. By lining up a back-log of documents in the buffer 60, the asynchronous nature of the upstream accumulator 40 will have less impact on the synchronous inserter chassis 70. For example, if a particularly long phone bill were being formed in the accumulator 40, a larger than normal gap might form with the preceding document. However, this gap will not have an affect on synchronous placement of documents on the chassis 70 because the buffer 60 preferably includes enough documents that the longer document can "catch up" before its turn to be placed on the synchronous chassis 70.

Another important function of the buffer 60 is its ability to "park" document accumulations when the chassis 70 is stopped, or otherwise unable to accept documents. When the chassis 70 must be stopped, for example as a result of a jam, a signal is typically sent to the web feeder 10 and web cutter 20 to cease operating. However, pages that are already in the process of being cut, or that are in the right angle turn 30, or in the folder 50, need a place to come to rest. Such components in the inserter input stage run all the time, and do not have the capability of halting part-way through their processes.

The accumulator 40 typically provides one or two parking spots, or stopping stations, for such documents that are "in progress." However, documents in the accumulator 40 may have to be sent downstream to make room for further "in progress" documents from upstream. When the chassis 70 is stopped, there must be at least enough stopping stations in the buffer 60 and accumulator 40 to accept all of the "in progress" documents and pages. In particular, when the mail pieces are comprised of shorter numbers of pages, more stopping stations may be needed because more document accumulations result from the same number of pages being cut.

Accordingly, it is desirable that the buffer 60 be designed to include enough stopping stations to satisfy the parameters of the accumulation lengths and page counts as required by the inserter user.

In the prior art buffer depicted in FIG. 2, six stopping stations are provided over a forty-two inch buffer length. The space within each stopping station being seven inches. Each of the prior art stopping stations, 1, 2, 3, 4, 5, and 6, includes a roller nip 14. When a document accumulation must stop at a stopping station, the respective roller nip 14 is stopped. When it is time for a document accumulation to move to the next stopping station, the respective roller nip 14 drives the accumulation downstream.

The seven inch spacing between roller nips 14 is longer than the typical document accumulation to be transported.

Accordingly, a mechanism for moving accumulations between roller nips 14 is provided. This mechanism is comprised of o-ring belts 13 that are driven around the length of the buffer transport system by rollers 12. These o-ring belts 13 and rollers 12 run continuously and provide for transportation of accumulations between roller nips 14 at different stopping stations. The o-ring belts 13 continue to run even when one or more of the stopping stations and respective roller nips 14 are stopped. When an accumulation is stopped at the roller nips 14, the o-ring belts 13 slip over and under the accumulations. Accordingly, the tension of the o-ring belts 13 is light, and the surfaces in contact with the accumulations have low friction. As such, rollers 12 and belts 13 are incapable of implementing any control over the stopping and starting of movement of documents in the buffer. Rather, control of the relative movement of documents within the buffer is provided by the roller nips 14.

The roller nips 14 are controlled in accordance with predetermined rules for moving documents within the buffer. When a sensor 11 detects an accumulation within a first stopping station, a decision must be made about what to do with it. Accordingly, when a downstream accumulation is detected in the immediate downstream stopping station, then the accumulation is held in the first stopping station. If there is no accumulation in the immediate downstream stopping station, then the roller nip 14 moves the accumulation downstream to the next station. This logic is used for each of the stopping stations 1–6 for every period in the control cycle. Accordingly, documents are generally shifted towards the downstream end of the buffer as stations become available.

SUMMARY OF THE INVENTION

While the prior art system described above often performs satisfactorily, the forty two inch buffer length and seven inch stopping station length are often longer than necessary to handle documents being processed. While these dimensions might be necessary to handle the longest documents to be handled by the inserter system, a more typical letter sized page folded into thirds would be roughly four inches long. Many accumulations are shorter still.

Accordingly, the prior art often uses more floor space than necessary for a given mail piece creation job, and maximum efficiency in storing and transporting documents is not achieved. Floor space being an important consideration for large pieces of equipment such as inserters, it is desirable to achieve the same (or greater) functionality in less space.

The present invention provides a solution to these shortcomings by providing a transport system that can use the available length of the buffer transport to more efficiently meet the particular needs of a given mail piece job run.

Accordingly, the present invention provides a method for controlling the serial transport of articles to achieve and maintain a predetermined gap between transported articles. First and second articles are transported serially on a transport system. The velocities and positions of the first and second articles are measured during the transporting process. The invention operates on a periodic operating cycle. During each period of the operating cycle, an adjustment to the second article is determined based on the various factors including the position of the preceding first article. For each period in the cycle, the invention calculates a current gap between the first and second articles as a function of a distance between a trail edge of the first article and the lead edge of the second article. Then the predetermined gap is subtracted from the current gap to determine a distance the first document is from reaching the edge of the predetermined gap. The controls for the present invention further calculate a minimum displacement needed to decelerate the second article to the velocity of the first article.

This minimum displacement must be considered it is desirable that the predetermined gap be maintained even if the first article comes to a halt at its maximum deceleration. If the second trailing article is traveling faster than the first article, even if decelerating at the same rate as the first article, more displacement will be required before coming to a complete stop. Accordingly, an additional spacing must be maintained to take into account a stopping displacement differential resulting from the second article traveling faster than the first article.

Based on these calculations the control system determines if the distance from the second document to the edge of the gap is substantially the same as the minimum deceleration distance. If so, then the second article is accelerated (or decelerated) at a calculated acceleration to ensure that the minimum deceleration distance does not encroach into the predetermined gap, and that the second document continues to approach the predetermined gap. The calculated acceleration is a function of a maximum acceleration parameter of the transporting means, the starting velocity of the second article, and the velocity of the first article. The calculated acceleration may be positive or negative depending on the whether the second article is going faster or slower than the first article.

Further details of the present invention are provided in the accompanying drawings, detailed description and claims.

DETAILED DESCRIPTION

Figure 3:
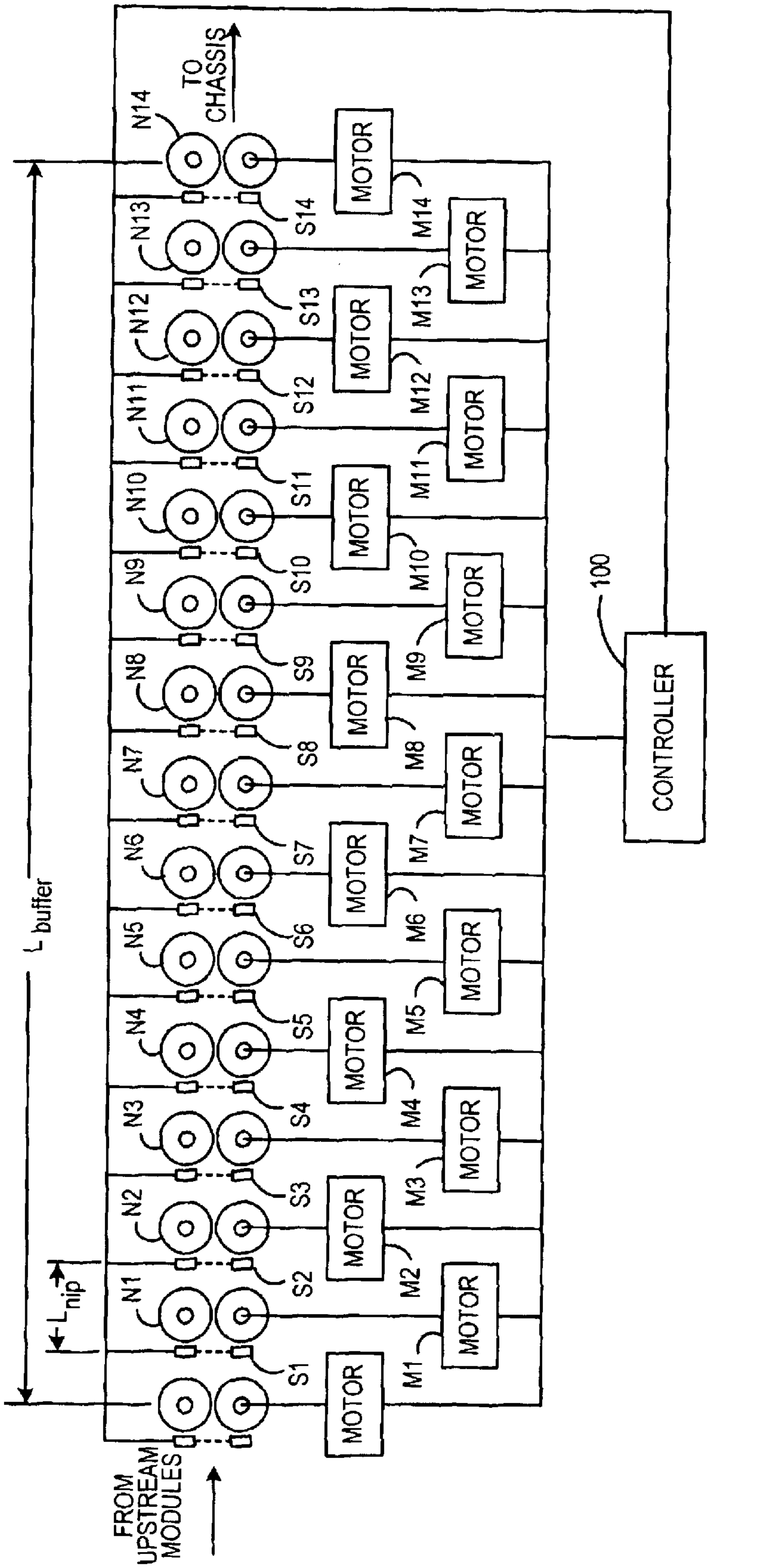
FIG. 3 depicts a preferred buffer transport for use with the present invention.

FIG. 3 provides a schematic representation of a preferred buffer transport that may be used with the present invention. The buffer transport is comprised of a plurality of roller nips N. separately marked N1–N14. Each of the roller nips is independently driven by a servo motor M, respectively marked M1–M14, in correspondence with the fourteen roller nips N. The motors M are controlled by controller 100. Controller 100 provides the control for the movement of the individual nips N in the system. Preferably, the motors M include encoders to provide pulses to the controller 100 to further monitor the displacement and position of documents in the system. Since encoder pulses from the motors M results in a corresponding known displacement, downstream positions of documents can be derived if a starting point is known. In addition, the controller 100 preferably provides periodic displacement commands to the motors M to control the motion of the documents within the roller nips N.

The servo motors M for use with the present invention are preferably capable of a velocity of 100 inches per second, and 8.6 G's of acceleration. These capabilities will allow the buffer transport to support inserter system throughput speeds up to 18,000 mail pieces per hour.

The consecutive roller nips N are preferably spaced apart a distance sufficient that they may successfully pass the smallest length accumulation of documents from on nip to another. In a preferred embodiment, this distance, $L_{nip}$, may be approximately two and a half inches. Accordingly, the entire buffer having nips N1–N14 would be thirty-five inches long.

The number of accumulations that may be "parked" in the buffer transport is determined by dividing the entire length of the buffer, $L_{buff}$, by the sum of the length of the documents, $L_{doc}$, and the minimum gap distance allowable, g, between document accumulations. Effectively the number of parking spaces (NP) may be expressed as $NP=L_{buff}/(L_{doc}+g)$, rounded down to an integer value. Accordingly if the downstream chassis comes to rest, NP will be the number of collations that can be provided from the upstream input modules before they must stop generating collations (ignoring parking spots in the accumulator 40).

Figure 1:
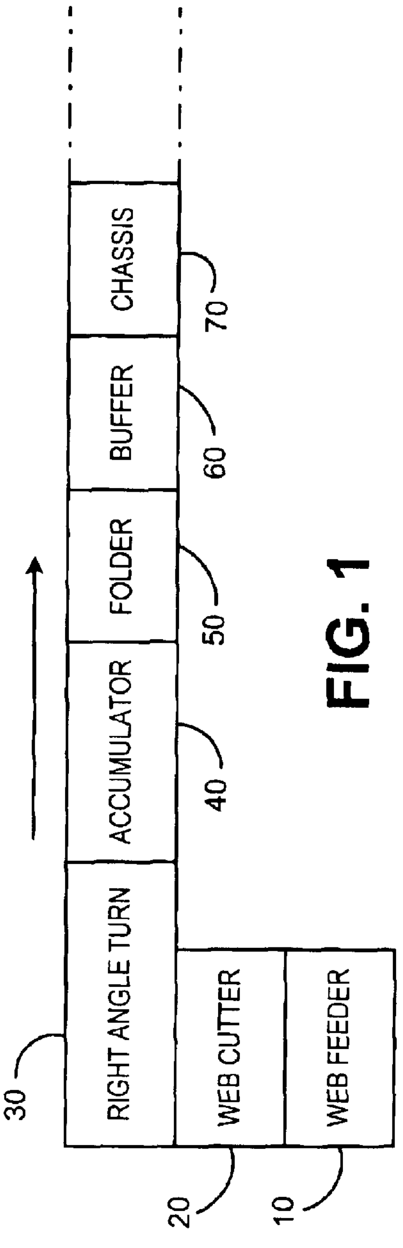
FIG. 1 is a diagram of the Input stages of an inserter system for use with the present invention.
Figure 2:
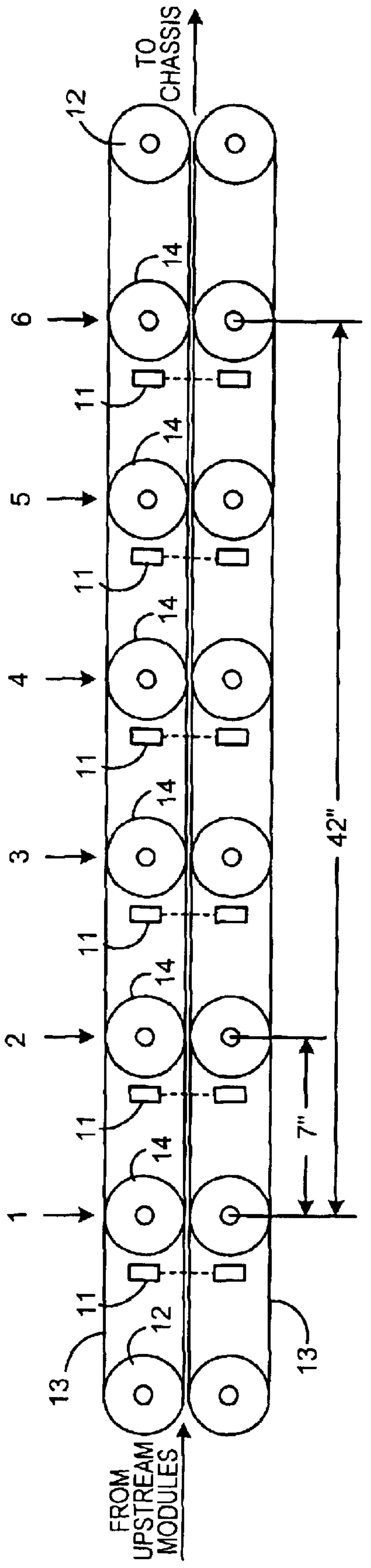
FIG. 2 depicts a first buffer transport system with which the present invention may be used.

For example, in the preferred embodiment where the consecutive roller nips N are spaced apart by two and a half inches, $L_{buff}$ will be 35 inches. If a document length of four inches and gap of one inch is selected, the above equation yields that seven parking spots will be available. Thus for this particular example, more "stations" for parking accumulations are available in the thirty-five inch buffer, than the six stopping stations in the forty-two inch buffer of the prior art, as depicted in FIG. 2. If a six inch document length is selected, however, it can be seen that this particular advantage of the present invention is lost, as only five parking spots will be available. Accordingly, more sets of roller nips N may be desirable for situations where it is known that greater numbers of parking spots will be needed for longer documents Along the length of the buffer transport, sensors S detect the lead and trail edges of accumulations traveling in the buffer transport. Preferably, there is at least one sensor S per roller nip N, as depicted by S1–S14 in FIG. 3. In that embodiment, the individual sensors are located at, or in close proximity, to the roller nips N. The sensors S are preferably optical sensors providing signals to the controller 100 providing positions of the passing edges of accumulated documents. Based on these sensor signals, the controller 100 can determine what roller nips N are in control of accumulations, where documents are in relation to one another, and to provide instructions accordingly.

The accumulation location information provided by the sensors may be further supplemented by the controller 100 by taking into account the encoder displacements from motors M. Such encoder displacements can provide document positions subsequent in time to signals from a particular sensor S indicating the presence of a lead or trail edge. In one alternative embodiment, sensors S may be used at alternate roller nips N, instead of every one, as shown in FIG. 3. In this embodiment, the controller 100 may rely more heavily on the encoder information gathered from the motors M for document position determinations.

The controller 100 individually controls each of the motors M to maximize the space usage within the buffer transport by driving each document accumulation to a predetermined distance from the next downstream accumulation. This control scheme is carried out in a recurring operational cycle. Controller 100 performs calculations and provides instructions for each roller nip N, during each sample period in the operational cycle.

In the preferred embodiment, the servo motors M are controlled via commands from controller 100 directing a particular displacement to occur during the sample period. The servo motors M have built-in properties of maximum velocity, maximum acceleration, and maximum deceleration. These properties limit the displacement that can be achieved during any given sample period. Further, in the preferred mode for control under the present invention, the servo motors M typically operate to achieve the desired displacement by (1) accelerating at the maximum acceleration, (2) maintaining the maximum velocity, (3) decelerating at the maximum deceleration, (4) dynamically accelerating at a calculated acceleration to achieve a specific displacement during the operating cycle, or (5) remaining at rest.

As mentioned above, for each sampling period in the operational cycle, the controller 100 takes account of several parameters and performs a number of calculations. A first parameter is $X_{gapt}$, the actual gap between consecutive documents at the sampling period, t. $X_{gapt}$ is measured from the input the sensors S indicating the positions of the accumulations in the buffer transport. The controller 100 may also preferably supplement the sensor information with displacements measured from the servo motor M encoders. Such encoder information provides the displacement of the document that has occurred subsequent to the sensors' detection of documents' lead or trail edges.

Relevant parameters are summarized as follows:

A=the maximum acceleration of a buffer nip (a deceleration when negative in value);

$V_{max}$=the maximum velocity of a buffer nip, $X_{gapt}$=(as described above) the actual gap between documents at sampling period t, Vds=the velocity of the downstream document at sampling period, t, v0=the initial velocity of the buffer nip at the beginning of the sampling period, v1=the velocity of the buffer nip to be achieved at the end of the sampling period, a=the dynamic acceleration calculated for the buffer nip during the sampling period.

During each sampling period, the controller 100 calculates the difference between the actual gap, $X_{gapt}$, and the desired predetermined gap, g. This calculation may be expressed as:

$$X_t = X_{gapt} - g.$$

The controller 100 also calculates the displacement that would be required to decelerate from the current velocity, v0, to the velocity of the downstream document, vds. This deceleration displacement, $X_{decelt}$, is significant because it would be undesirable to overshoot the desired gap, and possibly crash into the downstream accumulation. This calculation of $X_{decelt}$ utilizes the maximum deceleration, A, of the buffer nip, but any other deceleration to be used may be substituted into the equation:

$$X_{decelt} = (Vds^2 - V0^2)/(2*A).$$

For this equation, it should be noted that the both the numerator and the acceleration will be negative values, causing the ratio, $X_{decelt}$ to be positive.

For purposes of the present invention, it is important to describe the relative positions and velocities of the consecutive documents. As will be understood by one skilled in the art, velocities are quantities that are relative to the points of reference used. The description provided in this application often describes the position and velocity of the second document relative to the first document. It will be understood that the velocities of the documents could also be reasonably described relative to the stationary structures of a machine transporting the documents. However, for the purposes of the present invention, such alternate use of reference points should be considered to be exactly the same in terms of what the invention is that is being described.

Based on the above parameters and calculated values, for each sampling period, the following logic is used to determine the acceleration, a, to be applied to a roller nip N to achieve the desired displacement for that sampling period.

If $X_t$ is greater than $X_{decelt}$ then there is currently no danger of the second document encroaching on the predetermined gap. However for efficient use of space it is desirable to urge the second document to be at the predetermined gap distance from the first document. Thus, if the current velocity is less than the maximum velocity, motor M is commanded to accelerate at the maximum acceleration, A. This logic is designed to bring the document to the predetermined gap distance as quickly as possible.

If $X_t$ is less than $X_{decelt}$, then a problem exists in that the predetermined gap could be violated if the first document were to suddenly reduce speed. Under this circumstance, a predetermined deceleration is applied, preferably a maximum deceleration. Immediate deceleration is required in order to prevent the possibility that the documents will crash into each other.

If $X_t$ is equal to, or substantially the same as, $X_{decelt}$, then the documents have reached a point where they are as close as can be allowed under the current conditions. However, if the upstream document is traveling faster than the downstream document and no adjustments are made, the upstream document will quickly cross the threshold distance required to be able to maintain the predetermined gap if the transport were required to stop suddenly. Accordingly, in this circumstance a predetermined algorithm is applied to dynamically determine a calculated acceleration for the upstream document so that it can continue to follow as close as possible to the downstream document without violating the spacing requirements, and to gradually close in on the predetermined gap. In the case where the upstream document is traveling more quickly than the downstream document, the new calculated acceleration will be negative to reduce the velocity so that less space is required to match speeds with the downstream document.

The dynamic acceleration algorithm to be applied every control cycle period is further described with reference to the following equations.

The new velocity to be achieved at the end of a given sampling period is designated as v1 and may be expressed as follows as a function of the original velocity, v0, plus the product of the acceleration a and the length of time of the sampling period t.

$$v1=v0+at$$

The displacement of the upstream document over the control cycle period at a new velocity is expressed as:

$$v1t$$

The change in $X_{decelt}$ resulting from changing from velocity v0 to velocity v1 during the sampling period is shown in the following expression. This expression represents how a shift in velocity changes the amount of displacement required to halt the document using a maximum deceleration value of A.

$$\frac{1}{2}\frac{v0^2-v1^2}{A}$$

Assuming a constant velocity, the displacement for the downstream document during a given sampling period may be expressed as:

$$vds\ t.$$

The following equation serves as the basis deriving the calculated acceleration, a, to be determined by the algorithm, and applied to a motor M for the corresponding roller nip N. The algorithm for determining the acceleration a is a function of balancing a displacement to be achieved by a new velocity during the sampling period, balanced with a corresponding reduction in the displacement required to match velocities and the displacement of the downstream document during the sampling period. The desired acceleration would create a change in position and change in velocity displacement shift equal to the downstream change in position $$v1t\frac{1}{2}\frac{v0^2-v1^2}{A}=vds\ t$$

This equation requires that the difference in the displacements of the two documents traveling at different speeds during the sampling period be offset by the change in $X_{decelt}$ caused by the change in velocity of the upstream document.

Replacing v1 with vo+ at for the above equation the following equation is derived.

$$(v0+at)t+\frac{1}{2}\frac{v0^2-(v0+at)^2}{A}=vds\ t$$

Solving for the dynamic acceleration a the following quadratic equations are derived.

$$v0t+at^2+\frac{1}{2}\frac{1-2v0at-a^2t^2}{A}=vds\ t$$

$$2A\ v0t+2Aat^2-2v0a^2t^2=2vdstA$$

$$2A\ v0t+2Aat^2-2v0at-a^{22}-2vdstA=0$$

$$-a^2t^2+(2At^2-2v0t)a+2Av0t-2vdstA=0$$

By substituting the actual values for the variables t, A, v0, and vds, the roots of the quadratic equation are readily derived. Exemplary values for these variables may be as follows: t=0.0005 seconds, A=−85 m/s$^2$, v0=2.54 m/s, and vds=1.0 m/s. Substituting in these values the roots −10279 and −51 are determined as values of a satisfying the quadratic equation.

In accordance with the present invention, only the solution that fits within the operating parameters of the servo motor M is selected as the acceleration a to be applied. For the present invention, maximum acceleration of +/−85 m/s$^2$ is the range of operation for a servo motor M. Thus, for the example above, the root of −51 m/s$^2$ is the acceleration that is applied. The solution of −10279 m/s$^2$ falls outside the usable range, and is disregarded as a solution for a in this preferred embodiment of the invention.

Application of the algorithm and corresponding equations will allow an upstream document to smoothly match speeds with the downstream document without creating a condition whereby the upstream document might be required to encroach into the predetermined gap.

This algorithm is also applicable to situations where the downstream document may have a velocity greater than the upstream document. In such situations, the acceleration a will be a positive value, and will preferably be a configured maximum acceleration to bring the upstream document to the preferred gap distance. Thus, once the upstream document comes under the control of the algorithm of the preferred embodiment of the invention, it will smoothly advance to the predetermined gap, and maintain the predetermined gap even as the downstream document varies in velocity.

As a result of the logic described herein, the document is continuously driven to a position where it is upstream of the downstream document by the predetermined gap distance, g. Application of these preferred algorithms also avoids creating an oscillating effect that would result from applying a binary on/off acceleration instead of the dynamic acceleration in accordance with the preferred embodiment of the present invention.

Figure 4:
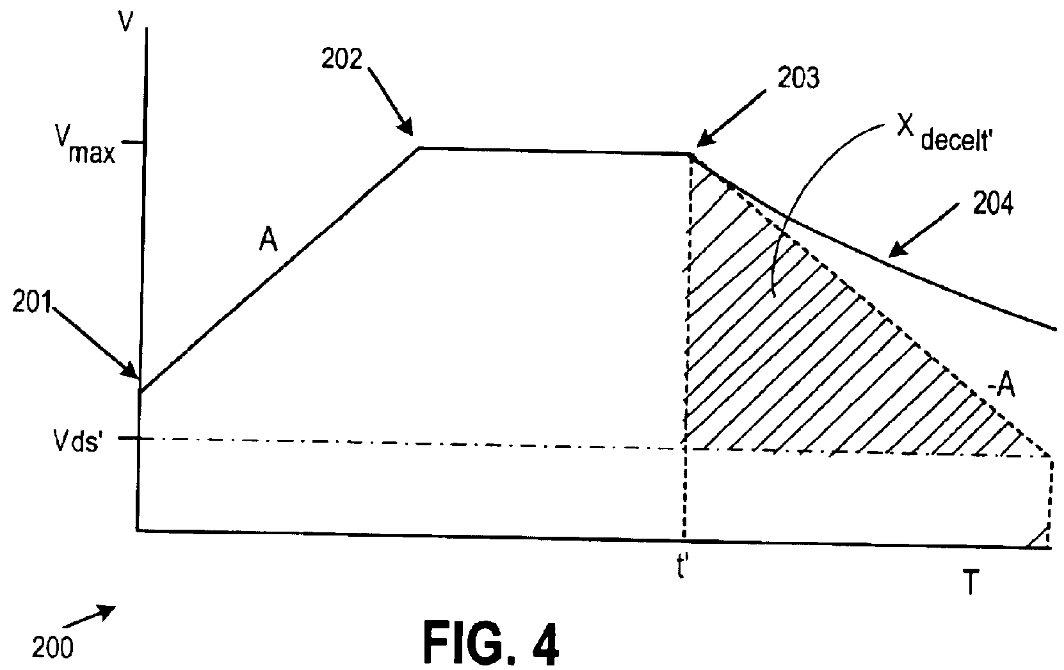
FIG. 4 depicts an exemplary motion profile for a document accumulation to be controlled in accordance the present invention.

An exemplary motion profile for a document controlled in accordance with this motion control logic is depicted in FIG. 4. The vertical axis of profile 200 is the speed of a document traveling in the buffer transport, while the horizontal axis represents time. The profile begins at point 201, where the above algorithm has determined that the distance to the downstream document is great enough that the maximum acceleration, A, should be applied. For subsequent sample periods, up until point 202 on the motion profile, the distance between documents continues to be sufficiently large that maximum acceleration is applied.

At point 202, the document has reached the maximum velocity, $V_{max}$, and no more acceleration can be applied. For the interval subsequent to point 202, sufficient distance exists between documents that the maximum velocity $V_{max}$ is maintained. At the sample period represented by t' at point 203, the displacement required to decelerate from the current velocity to the velocity of the downstream document has been determined to be equal to, or greater than, the actual distance to the downstream document. The shaded area labeled $X_{decelt}$represents this displacement that would be required to slow to the velocity Vds'. It is at point 203 that the above described algorithm for determining a dynamic acceleration, a, comes into affect to smoothly move the upstream document to the predetermined gap distance, regardless of variations in the velocity of the downstream document.

After point 203, since the velocity of the document is decreasing, the required deceleration displacement $X_{decelt}$ will also decrease. However, the available room to decelerate will also decrease as the document approaches the downstream document. The document may eventually come to stop, or start to accelerate again. The motion profile is dependent on the movement of the downstream document. If Vds' remains constant, the motion profile will form a hyperbolic curve approaching Vds', as shown by segment 204.

A special circumstance for control of nips N arises for the most downstream group of roller nips in the buffer transport. For that group, there will be no downstream document in the buffer transport from which to determine a motion profile as described above. Rather, transfers of document accumulations to the synchronous inserter chassis transport from that group of nips is based on the synchronous timing and availability of spaces on the synchronous chassis transport.

If the chassis transport is halted for some reason, the most downstream group of roller nips N will be instructed to stop the movement of document accumulations at the end of the buffer transport. Based on the halting of the most downstream document accumulation, the motion control algorithms eventually cause upstream documents to stop at their places within the buffer, By this mechanism, the buffer will fill with the maximum number of parked document accumulations, separated by the predetermined gaps.

Upon the stopping of the synchronous chassis transport, the input modules upstream of the buffer transport may be instructed to cease creation of new document accumulations. Accumulations that were already in progress are parked in the available stations in the buffer and the accumulator. Alternatively, the input modules may continue to create enough document accumulations to fill all of the remaining stopping stations, before being shut down. Under this alternative embodiment, the largest number of document accumulations will be immediately available for transfer to the synchronous transport when the system restarts.

Figure 5:
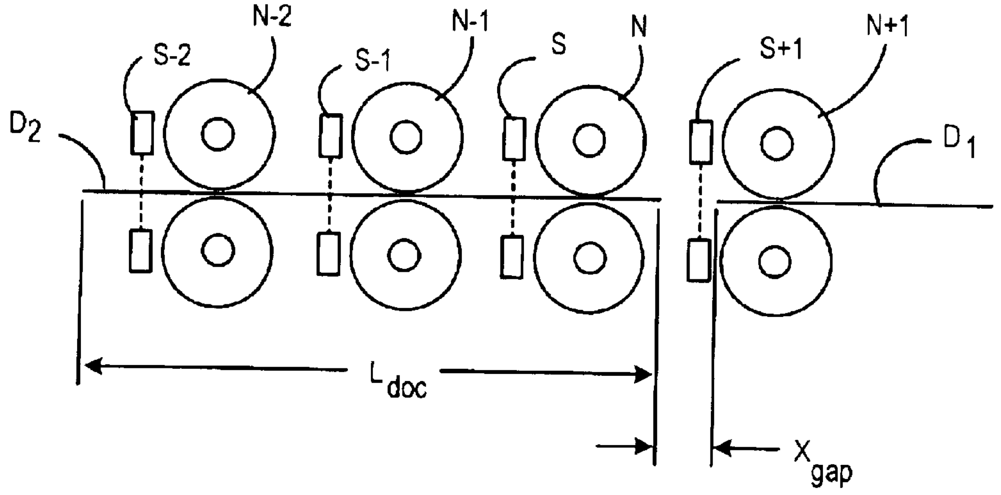
FIG. 5 depicts a preferred embodiment for selecting roller nips to slave together during operation of the buffer transport.

The motion control algorithms above apply to a group of roller nips N that are in contact with the document during the sample period. Preferably, the group of roller nips N are slaved together, one of the roller nips N being designated a master, with which the others are required to act in unison. In accordance with the preferred embodiment of the present invention, during each sample period, the controller assesses whether each roller nip N is a master or a slave for that period, and if a slave, which master it follows. At initial start-up, all roller nips N accelerate at maximum acceleration, a, to reach the maximum velocity, $V_{max}$. Subsequently the controller 100 uses the following logic to determine the master-slave relationship, as shown in reference to FIG. 5.

The master-slave relationships are determined as follows:

1 ) Nip N is initially slaved to nip N-1.

2) Nip N becomes a master when the leading edge of document D2 arrives at then nip N.

3) Nip N becomes a slave to nip N+1 when the lead edge of document D2 reaches nip N+1.

4) Nip N becomes a slave to nip N−1 when the tail edge of document D2 reaches the nip N.

This four-step cycle is repeated for each subsequent document transported by nip N. By applying this algorithm at each sample period, the controller insures that the appropriate nips N are used to control the motion of the document accumulations, while performing the motion profiles previously discussed.

The preferred embodiment of the invention described herein makes more efficient use of space than the prior art system described herein. Also, the positive control provided by the servo controlled nips N eliminates some unreliability that resulted from the prior art system's use of the continuously running o-ring belts.

As described herein, the preferred embodiment for implementing the present invention is carried out on a buffer transport such as the one depicted in FIG. 3. However, the invention may also be used as an improvement to a more conventional buffer transport such as the one depicted in FIG. 2.

As described above with regard to FIG. 2, the roller nips 14 that comprise the stopping stations 1, 2, 3, 4, 5, and 6 are controlled by logic whereby when a downstream accumulation is detected in the immediate downstream stopping station, then the accumulation is held in the first stopping station. If there is no accumulation in the immediate downstream stopping station, then the roller nip 14 moves the accumulation downstream to the next station. While this logic continues to apply, the motion control described above for controlling the spacing between documents may also be concurrently applied. Thus while documents are being moved between consecutive stopping stations the spacing may be controlled using the above equations. Under this arrangement, it will be necessary that the logic controlling stopping stations and the gap control logic be coordinated such that when either set of logic requires a lower velocity, then the lower velocity takes priority. Thus, the stopping of the documents at the stopping station may frequently cause the spacing of the consecutive documents to be more than a selected predetermined gap that the gap control logic is working towards.

A further improvement to the system depicted in FIG. 2 is achieved by advancing documents under the control of a stopping station as far as possible before coming to a complete halt. By doing this, the documents are advanced on the transport as far as possible, and the most efficient use of the available space may be achieved.

Limitations on how far a document may be advanced into the roller nip 14 before stopping are the velocity of the belts 13 (Vbelt) and the configured acceleration for the roller nip 14, (in this case A). The reason for this is that the document must be accelerated to the belt velocity, Vbelt, prior to being released from the stopping station. If there is not enough of the document under the control of the roller nip for the stopping station, then there will not be enough time to accelerate the document to Vbelt before it is released.

An expression describing the distance required to accelerate from a stop to Vbelt is as follows:

$$\frac{1}{2}\frac{Vbelt^2}{A}$$

Thus, according to this embodiment, a document stopped at a stopping station is advanced by a distance equal to the length of the document minus the minimum displacement derived from the above expression, through the rollers 14.

Although the invention has been described with respect to preferred embodiments thereof, it will be understood by those skilled in the art that the foregoing and various other changes, omissions and deviations in the form and detail thereof may be made without departing from the spirit and scope of this invention. In particular, those skilled in the art will recognize that mathematical expressions used to assist in describing the present invention may be alternately written in varying equivalent ways, and that it is the described relationships that comprise the invention, not any particular written expression.

What is claimed is:

1. A method for controlling the serial transport of articles to achieve a predetermined gap between transported articles, the method including:

transporting a first article on a transport system;

transporting a second article on the transport system immediately upstream of the first article;

measuring a variable first velocity and first position for the first article;

measuring a variable second velocity and second position for the second article;

for each period in a periodic operating cycle adjusting a position of the second article based on the position of the first article as follows:

(a) calculating a current gap between the first and second articles as a function of a distance between a trail edge of the first article and the lead edge of the second article;

(b) subtracting the predetermined gap from the current gap, the resulting difference herein referred to as distance Xt;

(c) calculating a displacement needed to decelerate the second article from the second velocity to the first velocity of the first article at a negative value of a maximum acceleration parameter, the calculated displacement referred to as distance Xdecel; and (d) if Xt is substantially the same as Xdecel, and the second velocity is different than the first velocity, accelerating the second article at a calculated acceleration so that Xt can remain substantially the same as Xdecel at the end of the current operating cycle period, the calculated acceleration being a function of the maximum acceleration parameter, the second velocity, and the first velocity.

2. The method of claim 1 wherein the step of adjusting the position of the second article based on the position of the first article further includes:

(e) if Xt is greater than Xdecel and the second velocity is less than a maximum velocity, accelerating the second article at a predetermined acceleration; and (f) otherwise, maintaining the second article at the second velocity without acceleration for the current operating cycle period.

3. The method of claim 1 wherein the calculated acceleration is determined by a quadratic equation and including the step of discarding a root of the quadratic equation that represents an unreasonable acceleration greater in magnitude than the maximum acceleration parameter.

4. The method of claim 1 wherein a velocity for the second article at the end of a given operating cycle period is designated "v1," a length of time for the operating cycle period is designated as "t," a velocity for the second article at the beginning of the given operating cycle period is designated "v0," the maximum acceleration parameter is designated as "A," a velocity of the first article for the given operating cycle is designated as "vds," and the calculated acceleration for the given operating cycle period is designated as "a," and further including the step calculating the calculated acceleration, a, using a quadratic calculation based on the following equations:

$$V1t+\frac{1}{2}\frac{v0^2-v1^2}{A}vds\ t$$

and $$v1=v0+at.$$

5. The method of claim 4 including the step of discarding a root of the quadratic calculation of "a" that represents an unreasonable acceleration greater in magnitude than the maximum acceleration parameter.

6. The method of claim 4 including the step of assuming vds to be a constant velocity during the given operating cycle period.

7. The method of claim 1 wherein the steps of transporting the first and second articles includes stopping the articles at a series of stopping stations along a transport path and further including the step controlling the stopping stations by detecting the second article within a second stopping station;

detecting whether the first article is present downstream in a first stopping station immediately downstream of the second stopping station;

stopping the second article in the second stopping station if the first article is detected in the first stopping station; and transporting the second article from the second stopping station to the first stopping station if the first article is not detected in the first stopping station.

8. The method of claim 7 further including the step of:

coordinating control of transporting the second article such that the second article will always decelerate to a lower of a velocity as directed by one of the two steps of controlling the stopping stations or adjusting a position of the second article based on the position of the first article as follows.

9. The method of claim 7 wherein the step of stopping the second article includes advancing the second article as far as possible in the second stopping station while retaining enough of the article upstream of the stopping station to allow accelerating the article to a desired release velocity upon resuming of transporting of the second article.

* * * * *